(12) United States Patent
Lohr (10) Patent No.: US 11,447,007 B2
(45) Date of Patent: Sep. 20, 2022

(54) VEHICLE-RAMPAGE BRAKING SYSTEM

(71) Applicant: Marcus Lohr, Grossniedesheim (DE)

(72) Inventor: Marcus Lohr, Grossniedesheim (DE)

( * ) Notice: Subject to any disclaimer, the term of this patent is extended or adjusted under 35 U.S.C. 154(b) by 487 days.

(21) Appl. No.: 16/490,381

(22) PCT Filed: Mar. 12, 2018

(86) PCT No.: PCT/EP2018/055995
§ 371 (c)(1),
(2) Date: Aug. 30, 2019

(87) PCT Pub. No.: WO2018/166931
PCT Pub. Date: Sep. 20, 2018

(65) Prior Publication Data
US 2020/0009964 A1  Jan. 9, 2020

(30) Foreign Application Priority Data
Mar. 14, 2017  (DE) .......................... 102017105441.3

(51) Int. Cl.
*B60K 28/14* (2006.01)
*B60T 7/22* (2006.01)

(52) U.S. Cl.
CPC ................ *B60K 28/14* (2013.01); *B60T 7/22* (2013.01)

(58) Field of Classification Search
CPC ..... B60K 28/14; B60T 7/22; B60T 2201/024; B60T 2201/346; B60T 8/1701; B60I 3/0007; B60R 21/34
USPC ........................................................ 180/275
See application file for complete search history.

(56) References Cited

U.S. PATENT DOCUMENTS

| | | | | |
|---|---|---|---|---|
| 7,518,489 | B2* | 4/2009 | Nelson | G08G 1/207 307/10.6 |
| 7,539,569 | B2* | 5/2009 | Baur | G05B 9/02 701/45 |
| 8,150,575 | B2* | 4/2012 | Ewerhart | B60W 10/06 701/30.9 |
| 8,386,124 | B2* | 2/2013 | Ewerhart | B60W 30/085 340/463 |
| 8,997,913 | B2* | 4/2015 | Enzaki | B60W 10/184 180/277 |
| 11,161,475 | B2* | 11/2021 | Abiakle Kai | G08G 1/017 |
| 2006/0229785 | A1 | 10/2006 | Baur et al. | |
| 2009/0132112 | A1 | 5/2009 | Ewerhart et al. | |
| 2014/0222306 | A1* | 8/2014 | Wanami | B60R 21/0136 701/70 |

(Continued)

FOREIGN PATENT DOCUMENTS

| DE | 19829374 | 1/2000 |
|---|---|---|
| DE | 20318567 | 6/2004 |

(Continued)

OTHER PUBLICATIONS

English Translation for WO2006/106009 to Ewerhart et al.*
English Translation for WO 01/ 37239 to Daxerer et al.*
English Translation for WO2008/090205 to Krumm et al.*

*Primary Examiner* — Paul N Dickson
*Assistant Examiner* — Tiffany L Webb
(74) *Attorney, Agent, or Firm* — Volpe Koenig (57) ABSTRACT

A system for averting the threat posed by a vehicle rampage. The system includes at least one device for bringing the vehicle to a halt by external intervention. The system has a sensor arrangement which is connected to the device.

9 Claims, 6 Drawing Sheets

(56) References Cited

U.S. PATENT DOCUMENTS

| | | | |
|---|---|---|---|
| 2016/0208728 A1* | 7/2016 | Shigemori | ........ F02D 41/3005 |
| 2016/0332622 A1 | 11/2016 | Shiraishi | |
| 2021/0146930 A1* | 5/2021 | Estenne | ................ B60K 28/14 |
| 2021/0188210 A1* | 6/2021 | Abiakle Kai | ........... B60R 21/34 |
| 2021/0188226 A1* | 6/2021 | Abiakle Kai | ........... B60R 25/04 |

FOREIGN PATENT DOCUMENTS

| | | |
|---|---|---|
| DE | 202013000019 | 3/2013 |
| DE | 102014100929 | 8/2014 |
| DE | 112014004046 | 7/2016 |
| DE | 112014006344 | 11/2016 |
| WO | 0137239 | 5/2001 |
| WO | 2005056346 | 6/2005 |
| WO | 2006106009 | 10/2006 |
| WO | 2008090205 | 7/2008 |

* cited by examiner

VEHICLE-RAMPAGE BRAKING SYSTEM

TECHNICAL FIELD

The invention relates to a system and method for averting the danger of a vehicle ramming attack, wherein the system has at least one device for bringing the vehicle to a stop through external intervention.

BACKGROUND

More and more frequently, there are attacks in which assailants drive a vehicle into a crowd of people. In the attack in Nice, France on Jul. 14, 2016, an assailant drove a truck through a crowd of people. At least 86 people were killed and more than 400 were injured, some seriously. In an attack at the Berlin Christmas market on Dec. 19, 2016, an assailant steered a truck into a crowd of people at the Christmas market at the Kaiser Wilhelm Memorial Church. Due to the collision with the truck, 11 people died and an additional 55 were injured, some with life-threatening injuries.

Numerous lives could have been saved if the vehicles in these attacks had been brought to a stop earlier. In a vehicle ramming attack, often the only thing left for security or safety forces to do to avert danger is to shoot the driver. This can be done only with great difficulty. In addition, killing the driver makes it impossible for a later interrogation to discover the reason for the attack. Also, even if the driver is killed, the vehicle is still in motion and can kill additional people.

In WO 2008/090205 A1, an armored vehicle, for example, a tracked firefighting vehicle, is described, which has a system for averting the danger of a vehicle ramming attack. On the outside of the vehicle, there is a mechanically actuatable trigger element. The trigger element can be, for example, an electrical conductor that is enclosed by a glass dome. For actuating the trigger element, the glass dome is destroyed, so that the electrical conductor burns out, with the result that an interruption of the current flow through the electrical conductor is detected by the engine control module and the vehicle is immediately brought to a stop.

Such mechanically actuatable trigger elements can be reached only with great difficulty in a vehicle ramming attack involving a truck or a passenger car due to the relatively high speeds in comparison with an armored tracked firefighting vehicle.

SUMMARY

The object of the invention is to provide a system for averting the danger of a vehicle ramming attack, with which the vehicle can be reliably brought to a stop in the event of an emergency. The system should be easy to activate from the outside, especially by security and safety forces, so that, in the event of a vehicle ramming attack, as few people as possible are injured. In addition, the system should be able to reliably differentiate a vehicle ramming attack from other situations. The system should be able to be integrated into conventional passenger cars and trucks available on the market with the lowest possible expense. In addition, the system should be reliably protected against manipulation.

This objective is achieved by a system and by a method with one or more of the features of the invention. Preferred variants can be found in the claims, the description, and the drawings.

According to the invention, the system has a sensor arrangement that is connected to a device for bringing the vehicle to a stop. The sensor arrangement acts indirectly or directly on the device that brings the vehicle to a stop in the event of a vehicle ramming attack.

In contrast to conventional systems according to the prior art with mechanically actuatable trigger elements, the sensor arrangement enables the vehicle to be reliably brought to a stop in the event of a vehicle ramming attack. In the event of an emergency, security or safety forces or private individuals can take advantage of the sensor arrangement to trigger a signal that acts on a device of the vehicle to bring the vehicle to a stop. The driver does not have to be killed and consequently can be interrogated to discover the reason for the act.

In a preferred variant of the invention, the act of bringing the vehicle to a stop is realized in that the sensor arrangement interacts with a driver assistance unit. The driver assistance unit can be, for example, an onboard computer. The driver assistance unit interacts with a braking system of the vehicle. Through an external intervention, for example, a projectile from a gun, a signal is generated by the sensor arrangement or a signal is interrupted. The driver assistance unit detects this signal or this interruption of the signal and acts on the braking system of the vehicle such that the vehicle is brought to a stop.

Additionally or alternatively, the driver assistance unit could also act on the propulsion system, for example, the engine. It is also possible that an acoustic and/or visual alarm is realized by the horn or the headlamps in addition to bringing the vehicle to a stop. Optionally, the doors and/or window regulators could also be locked for securing the driver.

For preventing danger, it can be sufficient to bring the vehicle to a stop by the braking system. Additionally or alternatively, it is also possible that the vehicle is brought to a stop by switching off the internal combustion engine or electric motor, so that the vehicle could then at most only roll to a stop and can be brought immediately to a stop in combination with an action of the braking system.

For bringing the vehicle to a stop, the sensor arrangement can act on different devices of the vehicle that are needed for operating the vehicle. This could involve, for example, interrupting the power supply or the fuel supply.

In one especially preferred construction of the invention, the sensor arrangement is a two-dimensional structure, for example, a plate or a film that is integrated at different positions of the vehicle. The two-dimensional structure has the advantage that it can be easily struck by a projectile from the outside. If a driver attempts to commit a vehicle ramming attack, the security or safety forces can shoot projectiles at the body panel of the vehicle in which the two-dimensional structure is integrated. If a projectile, for example, a bullet from a gun, strikes the two-dimensional sensor arrangement, this two-dimensional sensor arrangement triggers a signal that brings the vehicle to a stop.

It has proven especially favorable if the sensor arrangement is integrated, for example, integrally cast or molded, into conventional production components available on the market.

In one variant of the invention, the impact of a projectile causes the interruption of a signal in the sensor arrangement. The sensor arrangement is polled, for example, by an onboard computer, several times within a defined time cycle, for example, 100 times per second. If there is a communications failure, the onboard computer is programmed so that it acts on the braking system and brings the vehicle to a stop. It could also switch off the engine and/or also generate visual or acoustic signals.

Preferably, the two-dimensional structure has a surface area of at least 2 dm², in particular, greater than 3 dm², preferably greater than 5 dm².

In one favorable variant of the invention, the sensor arrangement is integrated into a headlamp element of the vehicle. For example, a headlamp element could be provided with a film or a plate that has the sensor arrangement. This could also be a transparent film, which is integrated, for example, in the cover of the headlamp arrangement, so that the light beam can pass through the film.

Additionally or alternatively, the sensor arrangement constructed as a two-dimensional structure could be integrated into the reflectors or the housing of a headlamp arrangement of the vehicle.

In one variant of the invention, the sensor arrangement is arranged as a two-dimensional structure in a body part of the vehicle. Here, it has proven advantageous if the two-dimensional sensor arrangement is integrated into an apron of the vehicle. In particular, the front apron is suitable. The front apron is here any part located directly below the hood in the front area of a vehicle body. Thus, it is large and sturdy, so that it takes on the function of absorbing impact forces. Only in older vehicle models is there still a bumper arranged as a separate component between the hood and the front apron. The sensor arrangement constructed as a two-dimensional structure could also be arranged in a bumper. The aprons of car bodies are usually made from plastic or composite materials. For example, the sensor arrangement could then be integrally cast or molded into this part or inlaid as a film during the manufacturing process.

In one especially preferred variant of the invention, the sensor arrangement has at least one conductor path. This can be an electrically conductive connection with a preferably two-dimensional profile, that is, it lies in a plane.

Preferably, the sensor arrangement has electrical conductor paths that lie relatively close to each other and form a kind of meshwork or network system.

Additionally or alternatively, optical conductor systems could also be integrated into the sensor arrangement as sensor surfaces.

If a projectile breaks through the close-mesh paths of the electrical or optical conductor network, the sensor arrangement generates a signal or a signal is interrupted. This leads to the vehicle being brought to a stop.

In one variant of the invention, the sensor arrangement comprises a detector for a radio signal. In this variant of the invention, the vehicle could be brought to a stop by a so-called radio beacon from security or safety forces. To do this, the detector is designed to scan a very specific frequency that can carry a radio signal only from relevant security or safety forces. The radio signal is preferably coded. It can be an analog or digital signal. If the detector of the sensor device detects such a specific radio signal, the sensor arrangement acts on a device for bringing the vehicle to a stop, preferably on the driver assistance unit, which then activates the braking system of the vehicle and thus brings the vehicle to a stop.

In one variant of the invention, the sensor arrangement has a receiver for a GPS signal. In this way, it is, in principle, conceivable that the system for averting the danger of a vehicle ramming attack is programmed so that the vehicle is automatically brought to a stop when it enters specified restricted areas that are protected by a "GPS beacon."

With a "GPS beacon," an acoustic or visual alarm could also be triggered as identification of a "vehicle ramming attack mode" before the vehicle is brought to a stop.

The vehicle could also be an electric vehicle in which the propulsion system is an electric motor.

If a sensor arrangement with a detector for a radio signal is used in the invention, the vehicle could be brought to a stop by a so-called radio beacon from security or safety forces.

The radio beacon could also act as a condition for simplified securing of the vehicle.

For bringing the vehicle to a stop, a combination of signals can be defined. For example, the following combinations can be used:
1.) Break-through of the close-mesh network of conductor paths and/or radio beacon.
2.) Break-through of the close-mesh network of conductor paths and/or GPS signal.
3.) Radio beacon and/or GPS signal.

The invention has special relevance for autonomously driving vehicles that could be used as a type of "drone" for committing attacks.

These restricted areas could be, for example, permanent pedestrian zones or areas that are stored in the system for a certain event and are set to not allow vehicular traffic. If the receiver of the sensor arrangement receives a GPS signal that corresponds to the geographical data of one of these either permanent or temporary restricted areas, then the vehicle is brought to a stop.

It has proven especially favorable if the system for averting danger interacts with other devices or comprises other devices that prevent the vehicle from being brought to a stop by mistake. For example, these devices could include an acceleration sensor. In this way, the system is able to differentiate, for example, a triggering or interruption of a signal due to a projectile from security or safety forces from, for example, damage to the sensor surface due to an accident as a result of the vehicle driving against another object. The combination of the destroyed sensor surface due to an accident in combination with the evaluation of signals of an acceleration sensor has the result that the system identifies that the event is an accident and not a vehicle ramming attack. The evaluation of GPS signals or other signals by devices of the vehicle in combination with the sensor arrangement of the system also enables the prevention of bringing the vehicle to a stop by mistake, for example, in the event of an accident, and thus a differentiation of a vehicle ramming attack. Special mathematical computational models could be used for this purpose. In this way, the severity of the vehicle damage could also be analyzed and, if necessary, measures could be taken, for example, the automatic initiation of an evasive maneuver.

BRIEF DESCRIPTION OF THE DRAWINGS

Additional features and advantages of the invention are given from the description of embodiments with reference to drawings and from the drawings themselves.

Shown are:
FIG. 1 a front view of a vehicle,
FIG. 2 a side view of a vehicle,
FIG. 3 a rear view of a vehicle,
FIG. 4 a headlamp arrangement of a vehicle,
FIG. 5 a schematic representation of a system for averting danger with a sensor arrangement that is integrated in a headlamp arrangement, and FIG. 6 a system for averting danger with a sensor arrangement that is integrated in a front apron of a vehicle.

DETAILED DESCRIPTION

Figure 1:
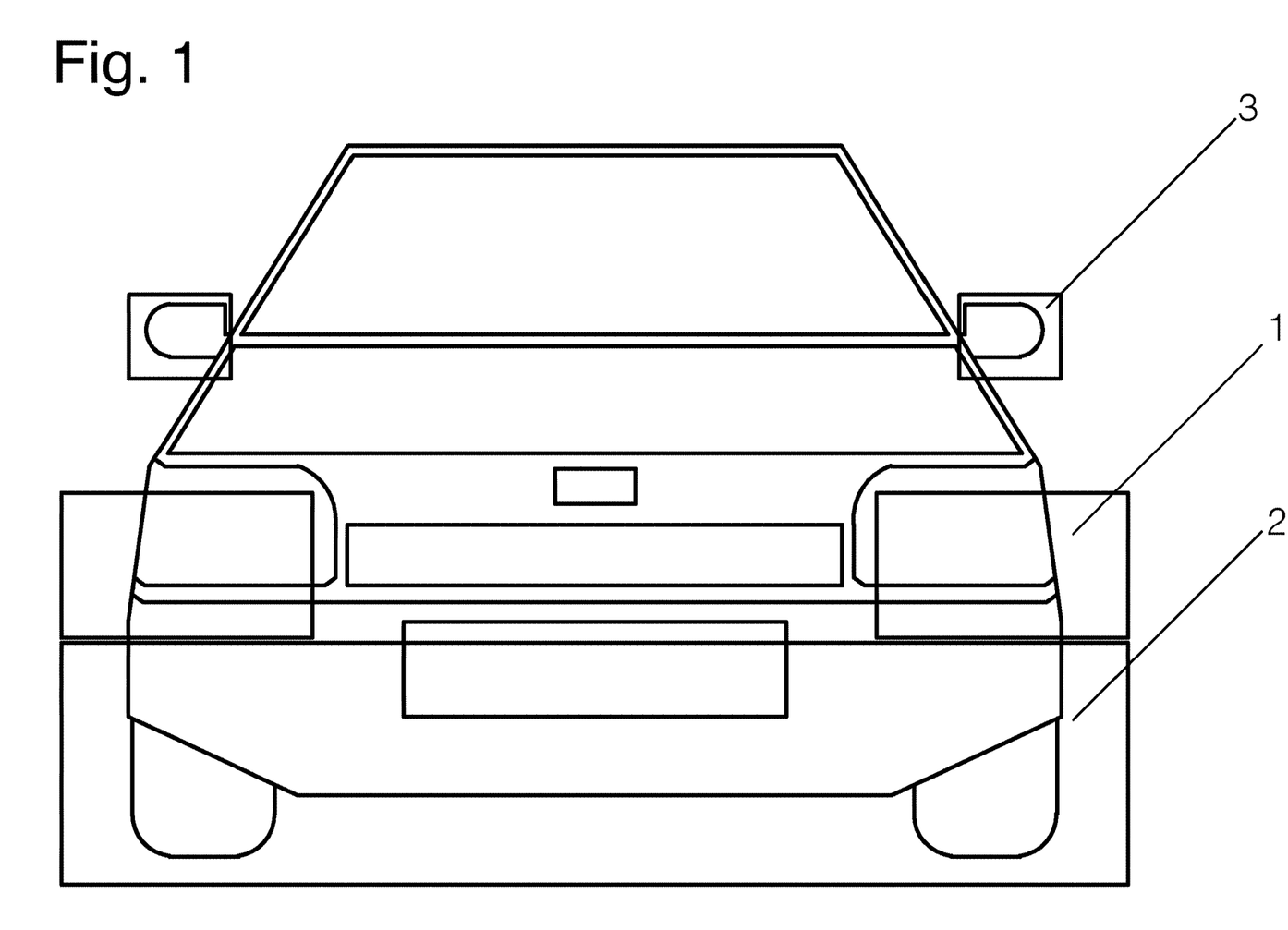

FIG. 1 shows a schematic front view of a vehicle with areas in which a two-dimensional sensor arrangement can be integrated. For example, a headlamp arrangement 1 of the vehicle is suitable for this purpose. Additionally or alternatively, a two-dimensional sensor arrangement could also be arranged in a body part 2 of the vehicle. In the embodiment, the body part 2 is the front apron of the vehicle. Additionally or alternatively, the sensor arrangement constructed as a two-dimensional structure could also be integrated into the exterior mirrors 3 of a vehicle.

Figure 2:
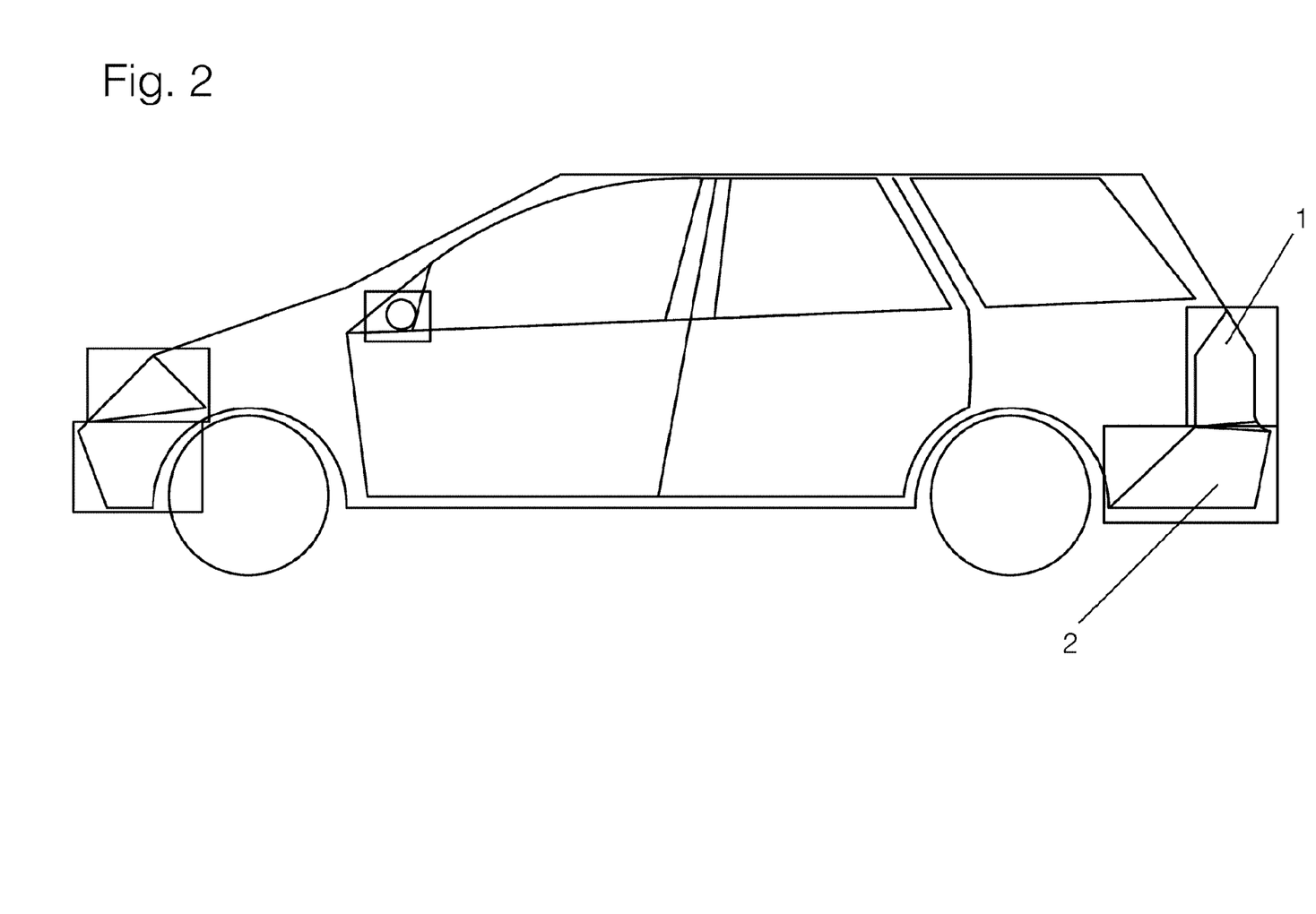

FIG. 2 shows a side view of the vehicle. In addition to the parts of the vehicle mentioned in FIG. 1, a sensor arrangement constructed as a two-dimensional structure could be arranged additionally or alternatively in the rear lighting assembly in addition to the front lighting assembly.

Figure 3:
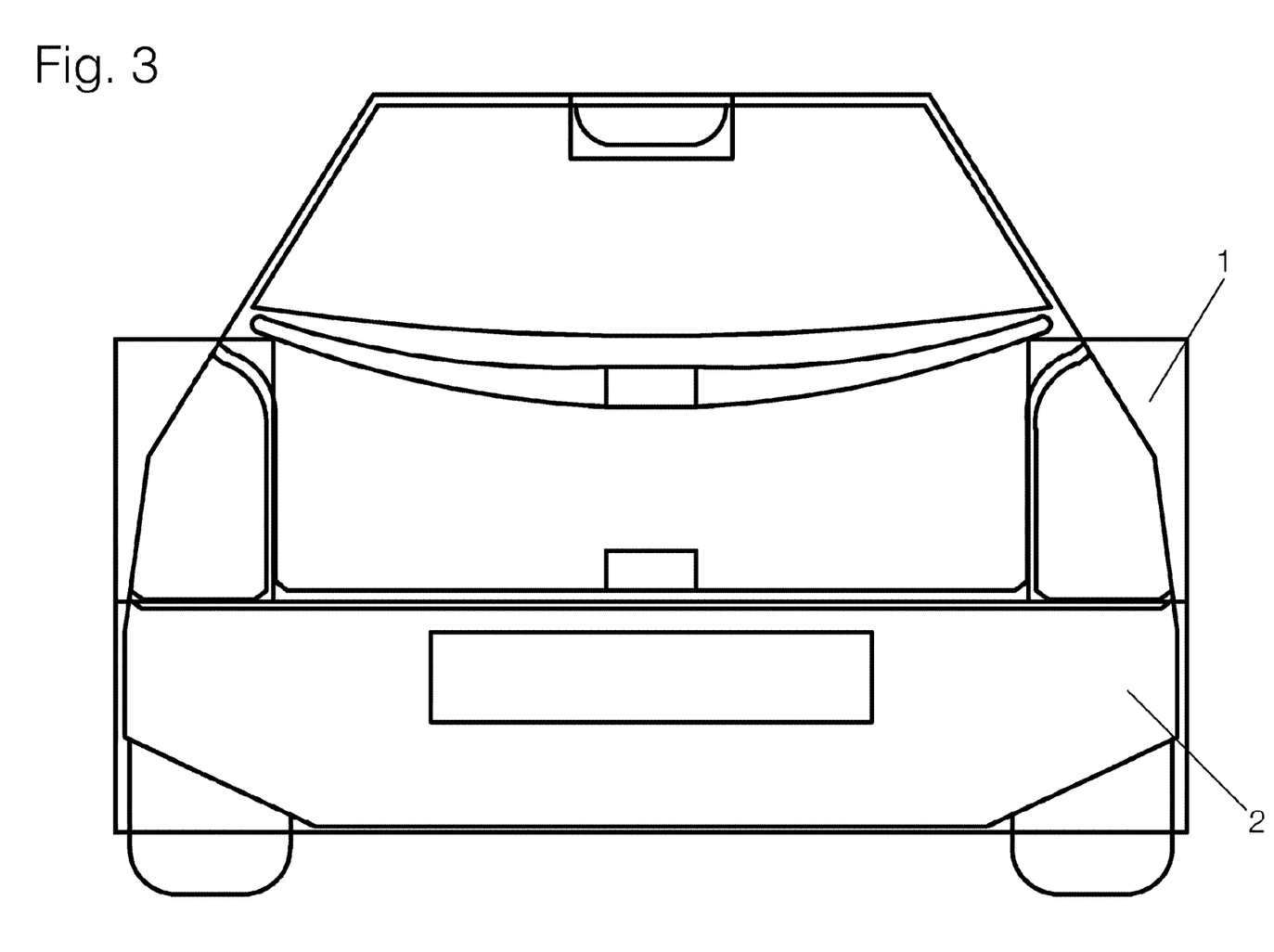

FIG. 3 shows a view of a vehicle from behind with the integration of a two-dimensional sensor arrangement in the rear lights 1 and the body part 3 constructed as a rear apron.

Figure 4:
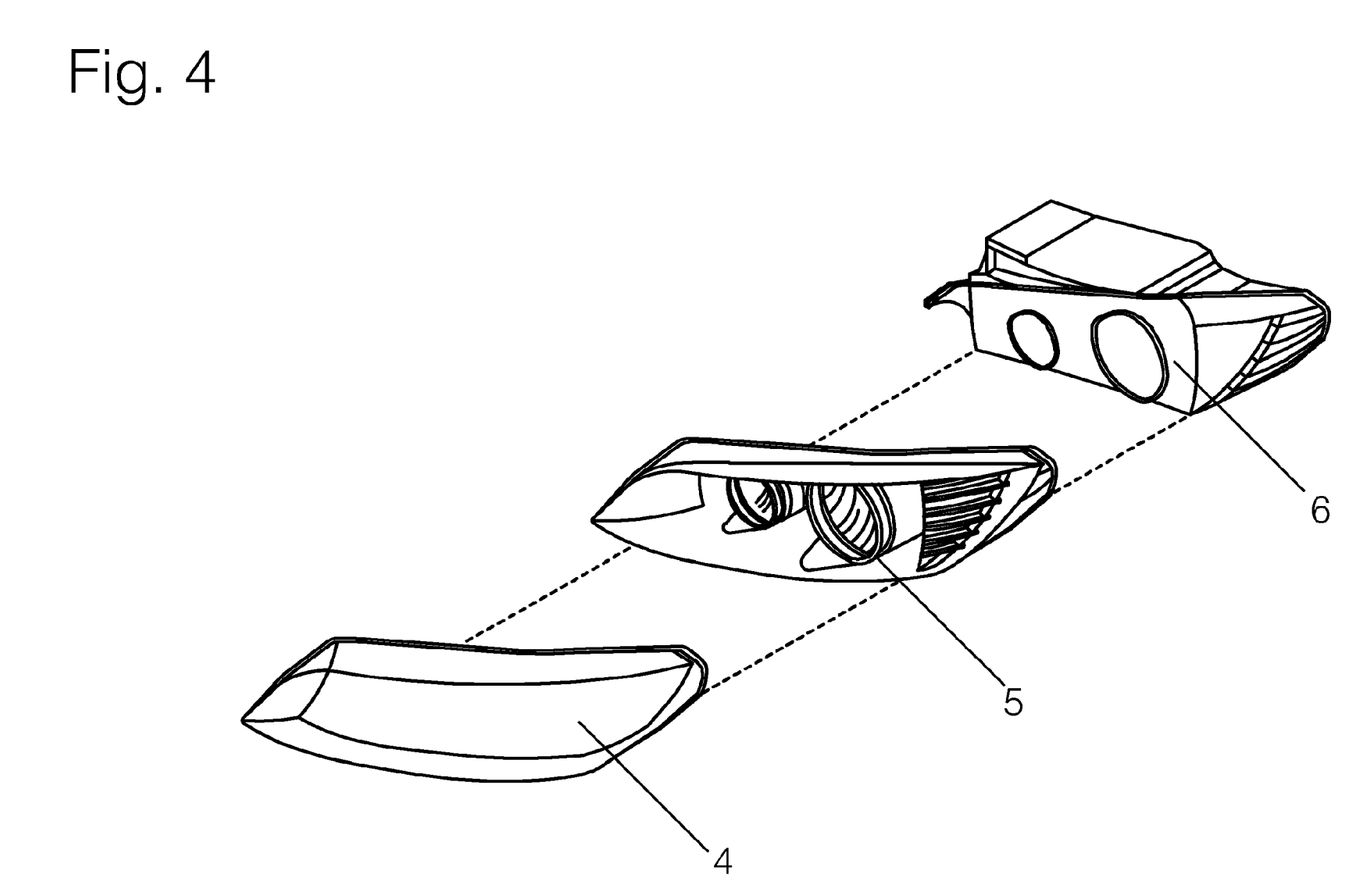

FIG. 4 shows a perspective exploded view of a lighting arrangement of a vehicle.

The sensor arrangement constructed as a two-dimensional structure could be arranged in the transparent cover 4 and/or in the reflector part 5 and/or in the housing part 6.

The two-dimensional sensor arrangement could be integrated, for example, in the transparent cover as a transparent film. Electrical lines and/or conductors could also be embedded in the transparent cover 4 during the manufacturing process.

The reflector part 5 could also be provided with a two-dimensional sensor surface. With the reflector part 5, in addition to the lighting sources, corresponding plastic parts could also be provided, in which the two-dimensional sensor arrangement can be integrated. Additionally or alternatively, the two-dimensional sensor arrangement could also be installed in the reflector part 5, for example, as a plate, film, or plastic part, wherein preferably the two-dimensional parts have conductor paths in the form of electrical conductors or optical conductors that pass through the two-dimensional structure in a mesh-like and/or network-like arrangement.

Figure 5:
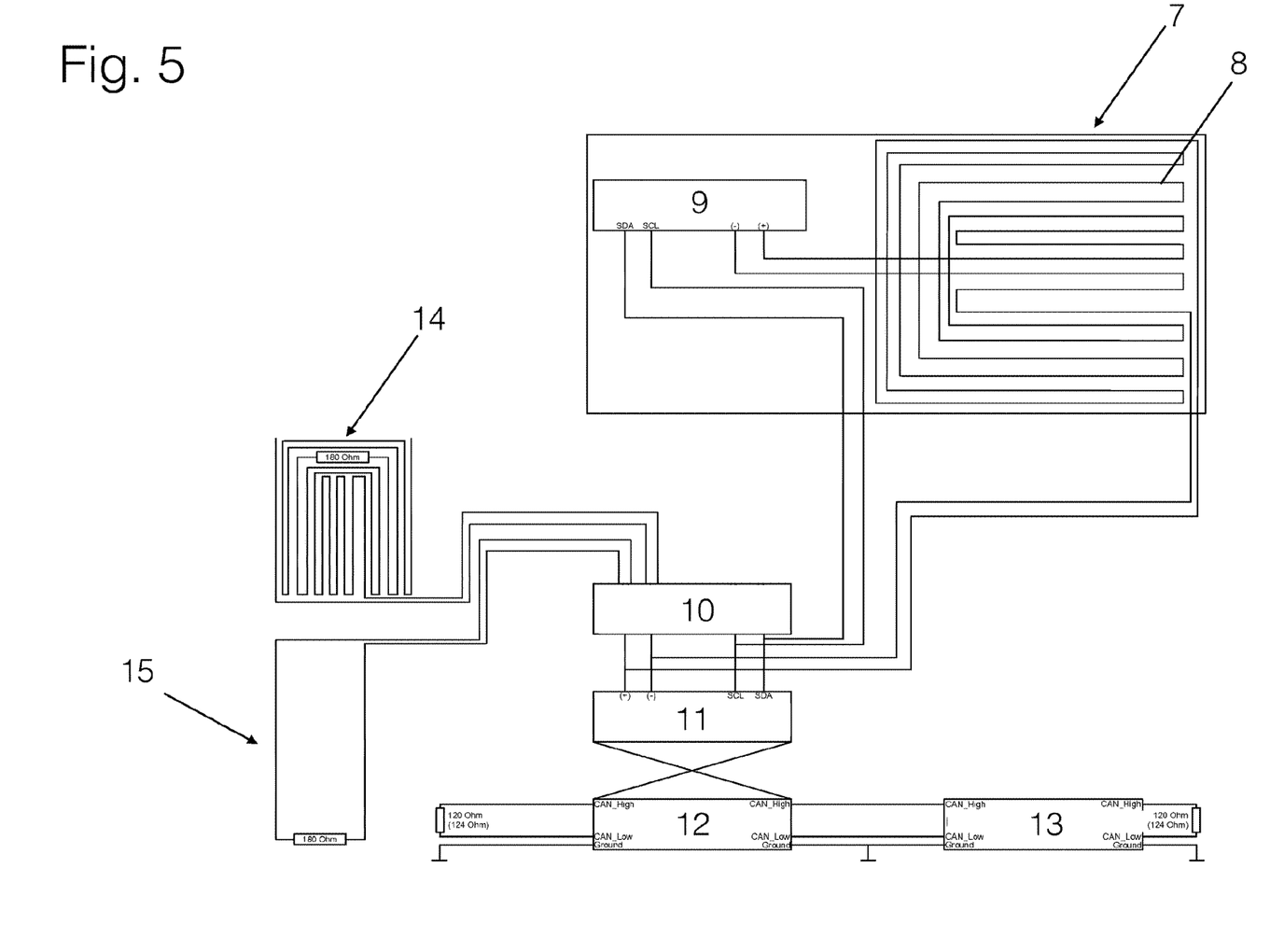

FIG. 5 shows schematically the setup of a system for averting the danger of a vehicle ramming attack. The illustration according to FIG. 5 has a two-dimensional sensor arrangement 7 that is integrated in a housing part of a headlamp. The two-dimensional sensor arrangement 7 comprises conductor paths 8 that pass through the housing part in a close mesh-like arrangement. The conductor paths 8 can be, for example, a close meshwork of wires or other electrical conductors. The sensor arrangement 7 could also be an electrical or optical conductor path 8 formed with at least one of a meandering arrangement or mesh. The conductor paths 8 are connected to a component 9. The component 9 can be, for example, an accelerometer. The component 9 is connected to an analog-digital converter 10 in the embodiment according to the illustration in FIG. 5. The analog-digital converter transmits signals to a microcontroller 11 that is, in turn, connected to a CAN bus controller (CBS) 12. This is connected, in turn, to an on-board computer 13 that is a CAN (Controller Area Network) participant. A CAN (Controller Area Network) bus is a serial bus system and belongs to field busses. Thus, the signal transmission is realized from the component 9 to the analog-digital converter (ADC) 10 via the microcontroller 11 to the CAN bus controller (CBS) 12 and then to the on-board computer 13 that acts as a driver assistance unit. The microcontroller 11 is used for connecting the CAN bus.

FIG. 5 further shows a two-dimensional sensor arrangement 14 that is integrated in a reflector part 5 of a headlamp arrangement. This two-dimensional sensor arrangement 14 also provides a meshwork and/or network and/or mesh-like construction of conductor paths 8 that can also be constructed, for example, as measuring loops. These can be, for example, electrical resistors. This sensor arrangement 14 constructed as a two-dimensional structure also connects to an analog-digital converter 10, a microcontroller 11, a CAN bus controller 12, and an onboard computer 13. The onboard computer 13 can be used as a driver assistance unit and can access different systems in the vehicle, for example, the brake system or the engine controller or another device that brings the vehicle to a stop.

FIG. 5 further shows a sensor arrangement 15 that is integrated in the transparent housing cover of a headlamp. Here, this is also a conductor path, for example, an electrical resistor, which is connected via the analog-digital converter 10, microcontroller 11, CAN bus controller 12 to the onboard computer 13.

Figure 6:
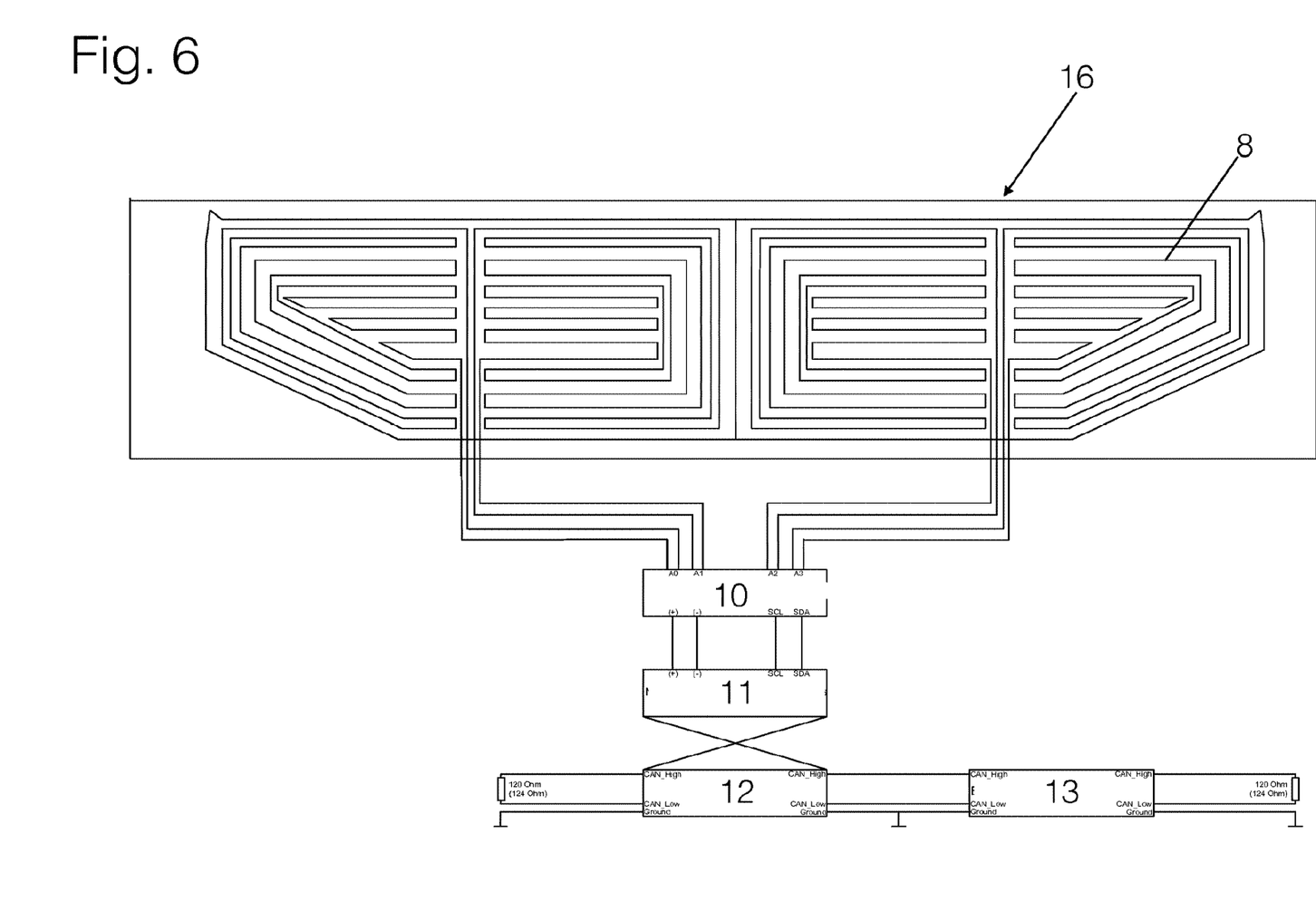

FIG. 6 shows a two-dimensional sensor arrangement 16 that is integrated in a body part of the vehicle. This is, for example, the front and/or rear apron of a vehicle. This body part is covered by a close-mesh network of conductor paths 8. If a body, for example, a bullet or a stone, impacts this two-dimensional sensor arrangement, it triggers a signal due to the interruption of the close-mesh network of the conductor paths and this signal is detected by the onboard computer 13. The onboard computer 13 then triggers the braking system and brings the vehicle to a stop or switches off the propulsion of the vehicle. The sensor surfaces that are installed, in the embodiments, for example, in the front and/or lamp housings are covered with a close-mesh network of conductor paths 8 that also can be constructed, for example, as wires, similar to an anti-break-in wall hanging. The conductor paths 8 can supply power, for example, to a sensor, such as a temperature sensor and/or an acceleration sensor, also accelerometer, or can maintain data communications. When reading-out or responding to a certain system-known address or to an address stored in the system, this sensor arrangement answers with a one-time serial number or a current value. If the communications with the sensor fails, the preconfigured hardware or software can react to this failure. This is also possible in combination with other measuring loops, other levels, and time sequences.

The invention claimed is:

1. A system for averting a danger of a vehicle ramming attack, the system comprising at least one device for bringing the vehicle to a stop through external intervention, and a sensor arrangement (7, 14, 15, 16) connected to the device for bringing the vehicle to a stop, the sensor arrangement having a two-dimensional structure and including at least one of an electrical or optical conductor path, and the sensor arrangement is configured to trigger a signal or interrupt a signal upon the at least one of the electrical or optical conductor path being penetrated.

2. The system according to claim 1, wherein the two-dimensional structure is integrated into a lighting arrangement (1) of the vehicle.

3. The system according to claim 1, wherein the two-dimensional structure is integrated into a body part (2) of the vehicle.

4. The system according to claim 1, wherein the at least one of the electrical or optical conductor path (8) is formed with at least one of a meandering arrangement or mesh.

5. The system according to claim 1, wherein the sensor arrangement (7, 14, 15, 16) has a detector for a radio signal.

6. The system according to claim 1, wherein the sensor arrangement (7, 14, 15, 16) has a receiver for a GPS signal.

7. The system according to claim 1, wherein the sensor arrangement (7, 14, 15, 16) is configured to interact with a driver assistance unit (13), and the driver assistance unit (13) is configured to act on at least one of a braking system or a drive system of the vehicle for bringing the vehicle to a stop.

8. The system according to claim 1, wherein the system is configured to interact with at least an acceleration sensor, for preventing the vehicle from being brought to a stop by mistake.

9. A method for bringing a vehicle to a stop, comprising the following steps:
   externally intervening on a sensor arrangement (7, 14, 15, 16) on the vehicle, the sensor arrangement having a two-dimensional structure and including at least one of an electrical or optical conductor path, and sensor arrangement is configured to trigger a signal or interrupt a signal upon the at least one of the electrical or optical conductor path being broken,
   at least one of outputting or interrupting the signal from the sensor arrangement (7, 14, 15, 16) to a device, and
   bringing the vehicle to a stop by the device acting on at least one of a vehicle braking system or a vehicle drive system.

* * * * *